United States Patent
Owen, Jr.

(10) Patent No.: US 7,421,444 B1
(45) Date of Patent: Sep. 2, 2008

(54) METHOD AND SYSTEMS FOR AUTOMATICALLY CREATING A DATA FEED FILE FOR USE WITH DESKTOP APPLICATIONS

(75) Inventor: Eugene E. Owen, Jr., Alabaster, AL (US)

(73) Assignee: AT&T Intellectual Property, I.L.P., Wilmington, DE (US)

(*) Notice: Subject to any disclaimer, the term of this patent is extended or adjusted under 35 U.S.C. 154(b) by 1093 days.

(21) Appl. No.: 10/689,132

(22) Filed: Oct. 20, 2003

Related U.S. Application Data

(63) Continuation of application No. 09/753,306, filed on Dec. 30, 2000, now Pat. No. 6,636,864.

(51) Int. Cl.
    *G06F 10/00* (2006.01)
(52) U.S. Cl. .................. 707/102; 707/100; 707/101; 707/10
(58) Field of Classification Search ................ None
    See application file for complete search history.

(56) References Cited

U.S. PATENT DOCUMENTS 5,608,874 A    3/1997  Ogawa et al.
5,678,046 A *  10/1997 Cahill et al. ............ 707/200
6,025,828 A    2/2000  Berry et al.
6,058,392 A *  5/2000  Sampson et al. ........... 707/6
6,199,082 B1   3/2001  Ferrel et al.
6,266,668 B1 * 7/2001  Vanderveldt et al. ...... 707/10
6,401,091 B1 * 6/2002  Butler et al. ............ 707/10

* cited by examiner

*Primary Examiner*—Sana Al-Hashemi
(74) *Attorney, Agent, or Firm*—Cantor Colburn LLP

(57) ABSTRACT

The present invention relates to methods and systems for automatically creating a data feed file for use by desktop applications. The invention comprises a raw data files that is stored on electronic storage devices inaccessible to desktop software applications. To gain access to data stored in the raw data file, a data feed file is generated and electronically transmitted to a location electronically accessible to a user-preferred desktop application. To generate the data feed file, the desired data is extracted from the raw data file based on data-locating criteria. The extracted data is further analyzed for compliance with data-limiting criteria which further defines the characteristics of data needed for the data feed file. The data extracted from the raw data file is then used to populate the data feed file. The data feed file is thereafter transmitted to a location accessible to the user-preferred desktop application for data tracking, data compilation, and various other types of data manipulation.

12 Claims, 5 Drawing Sheets

METHOD AND SYSTEMS FOR AUTOMATICALLY CREATING A DATA FEED FILE FOR USE WITH DESKTOP APPLICATIONS

CROSS-REFERENCE TO RELATED APPLICATIONS

This application is a continuation of U.S. patent application Ser. No. 09/753,306 filed Dec. 30, 2000 now U.S. Pat. No. 6,636,864, the contents of which are incorporated by reference herein in their entirety.

FIELD OF INVENTION

The present invention relates generally to methods and systems for data file creation. Embodiments of the present invention provide for automatic data extraction and data feed file creation at remote locations and transferring completed data feed files to locations electronically accessible to a software application.

BACKGROUND

The ability to gather and manipulate data is increasingly important in today's society. Small businesses and large corporations alike are aware that compiling, manipulating and reviewing data can provide valuable information about their present and future customers. Whether it is data on product usage or data on seasonal trends in customer purchases, the need to locate, gather on demand, and manipulate data is important. Even computer software designers are aware that the ability to manipulate and present data may provide valuable insight to business owners and managers. To that end, many software designers have developed software applications capable of manipulating and presenting data in a variety of ways to help improve data compilation and manipulation.

Companies have long recognized the need for gathering and storing data relating to its customers, suppliers etc. At one time, this data was kept in boxes and stored in rooms. When storage space for data became cumbersome, data was often transferred to mainframe computers and other like electronic data storage devices. These storage devices allow massive electronic data files to be stored in one location. However, when mainframes and other like devices became the preferred method of storing large volumes of data, the need and the technology to perform data manipulations to present data in a variety of ways was not as prevalent as it is today. Instead, the mainframe was often used to archive data that was important but infrequently accessed.

As times changed so did the purpose of storing data on a mainframe and the frequency with which this data was accessed. No longer is data stored on a mainframe primarily because it is historic information that needs to be archived. To the contrary, data is sometimes stored on a mainframe because it is so voluminous that it would occupy too much space on a local area network server, a wide area network server or a desktop computer hard drive. The increased frequency with which data on a mainframes is needed creates problems with efficiently providing desktop software applications access to the data when it is stored on a remote mainframe or other like data storage device.

To obtain information stored in data files on a mainframe, end-users often have to print the entire data file from the mainframe. Oftentimes, the data manipulation performed by the desktop software application does not require all the data stored in the data file on the mainframe. The end-user is, therefore, forced to manually filter through the voluminous data file, pinpoint the data needed and manually create a data feed file for use by the desktop software application. Thus, there is an obvious need for the capability to automatically and electronically select the data stored on the mainframe and generate a data feed file that is accessible to desktop software applications for data manipulation and presentation.

SUMMARY OF INVENTION

Generally speaking, the present invention relates to a method and system for generating a data file by extracting specified data from a larger raw data file. The goal of this invention is to generate a data feed file that can be used by desktop applications for any number of operations including, but not limited to, data compilation and data tracking.

According to an embodiment of this invention, the raw data file contains large volumes of related data. The raw data file is comprised of multiple records, each record comprised of at least one data field. Each data field contains the same category of data in each record of the raw data file. Assume, for this example and all examples hereafter, that the raw data file contains customer-billing information. Each record in the raw data file would therefore contain customer-billing information pertaining to an individual customer. Each record in the raw data file would further be comprised of data fields, each containing a different category of data, such as customer name, customer address, the customer phone number etc. Below is an example of the records and data fields of a raw data file.

|  | Data field (1) | Data field (2) | Data field (3) | Data field (4) |
|---|---|---|---|---|
|  | Customer Name | Customer Address | Customer Phone Number | ... |
| Record 1 | Anne Joseph | 123 Courtyard Dr | (555)555-5555 | ... |
| Record 2 | George Tilly | 324 Patent Dr | (555)444-1234 | ... |

In an embodiment of this invention, the raw data file is so voluminous that it is stored on a remote data storage device, such as a mainframe, instead of being stored on a computer hard drive, local area network (LAN) or other like electronic storage device accessible to a user-preferred desktop software application or applications.

In an embodiment of this invention, desktop software applications include, but are not limited to, the following commonly know software applications: MICROSOFT EXCEL, MICROSOFT ACCESS, and ORACLE. These software applications and other like applications, are used to perform operations such as, data compiling, data tracking and other types of data manipulation. In an embodiment of this invention, the user-preferred software application uses data contained in a raw data file that resides on a mainframe or other like data storage device. In an aspect of the invention, the operation performed by the desktop application, may not require all the data contained in the raw data file. Instead, the desired data manipulation may only require select data contained in the raw data file. It is the goal of this invention to generate a data feed file by extracting only needed data from the raw data file. The data feed file will then contain only the data the user-preferred desktop software application needs to perform its designated operation.

According to an embodiment of this invention, the data feed file is generated by extracting the desired data from the raw data file and populating the data feed file with the extracted data. To determine what data to include in the data feed file, the end-user develops a set of data feed file criteria.

In an embodiment of the invention, the data feed file criteria identifies the location of the desired data in the raw data file by identifying the data field in each record of the raw data file that contains the desired data. The data field containing the desired data may be identified in any number of ways. In another embodiment of the invention, the location of the data filed is identified by the category of data the data field contains. For example, a data field in each record of the raw data file may contain the amount payable by each customer. In such cases, the data field could be identified as the "amount payable data field".

In another embodiment of the present invention, the location of the data field is identified by the position of the data field in relation to other data fields in each record of the raw data file. For example, the data field that contains the desired data may be the fifth data field from the left in each record of the raw data file. In such cases, the data field could be identified as data field number five (5).

In addition to identifying the location of the desired data in the raw data file, the data feed file criteria may specify additional requirements for data to be included in the data feed file. For example, the data feed file criteria may specify that data located in the amount payable data field should be included in the data feed file only if the amount payable is greater than two hundred dollars ($200).

In yet another embodiment of the invention, the set of data feed file criteria may further contain criteria for including data not in any data field of the raw data file. For example, different service fees may apply to customers depending on the customer's zip code. However, the raw data file may not contain the various fees. In such cases, the data feed file criteria may specify that a data field in the data feed file include a designated service fee for customers depending on the customer's zip code.

In an embodiment of the invention, multiple raw data files may contain the data needed for the data feed file. In such cases, the data feed file criteria may further identify the raw data file from which specified data should be extracted.

Once the end-user develops a set of data feed file criteria for the data feed file, the end-user provides a data extraction tool the data-locating criteria. The data extraction tool then locates and extracts the desired data in the raw data file using the data-locating criteria. The data extraction tool further creates a report containing the extracted data.

Further, in another embodiment of the invention, data extracted from multiple data fields of the same record are placed on the same line in the report. The data extracted for each data field is separated by a space in the report. Each line of the report is also delineated by a print stop character.

As described above, the data feed file criteria may include criteria that defines the characteristics of data to include in the data feed file ("data-limiting criteria"). To ensure that the data feed file contains only the data specified by the data-limiting criteria, a discrimination tool reads the report created by the data extraction tool and verifies that the data on each line of the report complies with the data-limiting criteria. When the discrimination tool locates data on a line in the report that does not comply with data-limiting criteria, the discrimination tool deletes the entire line of data from the report. By eliminating the entire line of data, the discrimination tool eliminates all the unnecessary data from the report and prevents unnecessary information from being included in the data feed file.

In an embodiment of the present invention, the discrimination tool may not always be required. When the end-user only develops data-locating criteria, the discrimination tool may not be necessary and the step involving the discrimination tool may be eliminated.

After the report is created and includes only the data necessary to generate the data feed file, a formatting tool is used to complete the data feed file. The data feed file, like the raw data file, contains at least one record. Each record in the data feed file will further comprise at least one data field and each data field in each record will comprise a single category of data. The number of data fields in the data feed file is determined by the data feed file criteria. For example, if the data-locating criteria identifies the location of five (5) data fields in the raw data file from which data should be extracted, the data feed file will contain at least five data fields. Additional data fields may also be included in the data feed file if the data feed file criteria designates data to be included in the data feed file that is not contained in the raw data file.

In an embodiment of the invention, the formatting tool uses the data from the report to populate each data field in each record of the newly created data feed file. The formatting tool may further populate fields in the data feed file with additional data specified by the data feed file criteria. The formatting tool may also arrange data fields in the data feed file in any order specified by the end user.

Once the formatting tool has populated the data fields of the data feed file, the data feed file is ready to be used by the user-preferred software application or applications. The completed data feed file, is thereafter transmitted through the appropriate network to a location electronically accessible to the user-preferred desktop software application. In one embodiment of the present invention, the data feed file is transferred using a file transfer protocol (FTP) to a local area network (LAN) accessible to the user-preferred desktop software application.

An advantage of this invention is that the data feed file is created automatically. The invention eliminates the need to manually review the raw data file and manually enter the desired data from a raw data file to use with the preferred desktop application.

It is a further object of the invention to improve the integrity of information generated by desktop applications by eliminating data entry errors that inevitably occur when a data feed file is manually generated.

It is a further object of this invention to reduce the time needed to compile data for use with desktop applications.

It is yet another object of this invention to improve the ability to change and update reports created by desktop applications using data located on mainframes or other electronic storage devices.

DETAILED DESCRIPTION

Figure 1:
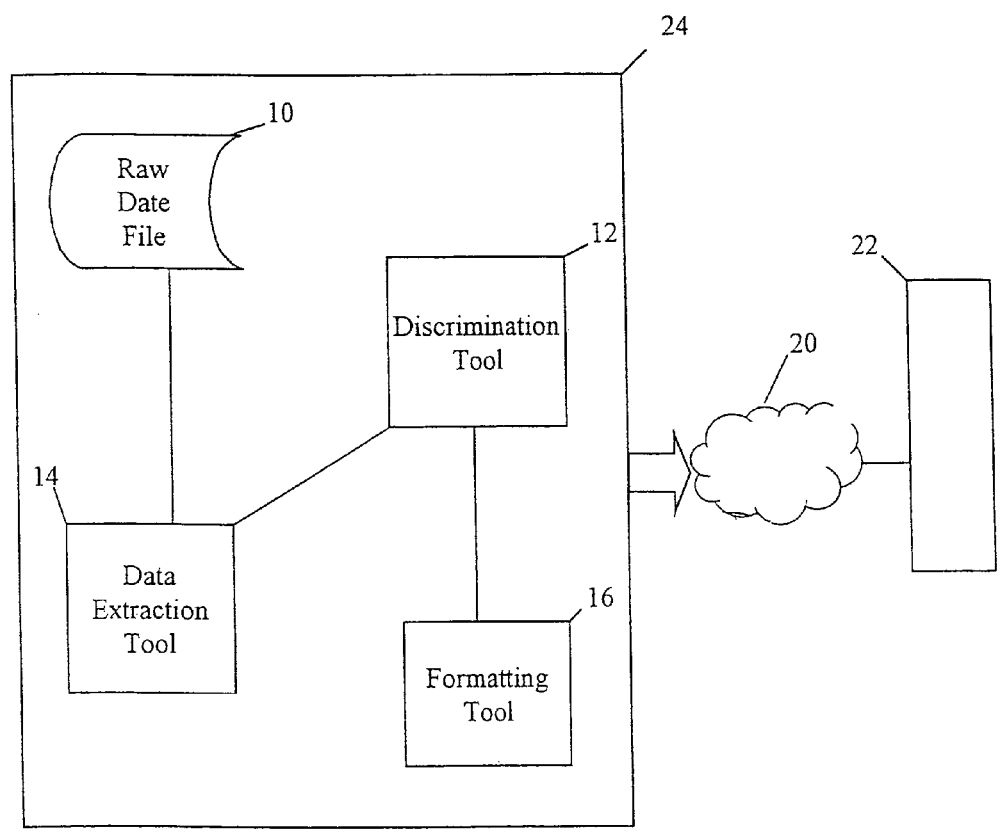
FIG. 1 is a block diagram that shows the elements of a system used to carry out the steps of the present invention.

The embodiments included herein are intended in all respects to be illustrative rather than restrictive. Alternative embodiments will become apparent to those skilled in the art to which the present invention pertains without departing from its spirit and scope.

Overview of the Invention

The present invention comprises a method and system for automatically generating a data feed file for use with desktop applications. The method comprises: developing a set of data feed file criteria comprising at least one data-locating criterion, extracting at least a portion of data from a raw data file based on at least one data-locating criterion, creating a report wherein the report comprises the extracted data, and populating the data feed file with data from the report.

In an embodiment of the invention, the method further comprises transmitting the data feed file to a location electronically accessible to at least one desktop application.

In yet another embodiment of the invention, a local area network is the location electronically accessible to at least one software application. In addition, the hard drive of a desktop computer may be the location electronically accessible to at least one software application.

In an embodiment of the invention, the raw data file comprises at least one record, each record comprises at least one data field. Data in the raw data file is separated into the data fields of the raw data file.

In an embodiment of the invention, the set of data feed file criteria comprises data-locating criterion; data-limiting criterion, and hard-coded data criterion. The data-locating criterion identifies the location of the desired data in the raw data file. The data-limiting criterion identifies characteristics of the desired data. The hard-coded data criterion identifies data to include in the data feed file that is not located in the raw data file.

In an embodiment of the invention, the location of desired data in the raw data file is defined as the location of the data field containing the desired data.

In yet another embodiment of the invention, the data field location is identified by the category of data the data field contains. The data field location may also be identified by the position of the data field in the raw data file.

In an embodiment of the invention, lines of the report created using data extracted from the raw data file are deleted when data on the line does not comply with data-limiting criteria.

Another embodiment of the invention comprises populating the data feed file with data provided by the hard-coded data criteria.

Another aspect of the invention comprises a system for generating a data feed file from a raw data file for use by a software application the system comprising: at least two data storage devices; a data extraction tool wherein the data extraction tool extracts data from the raw data file and creates a report containing the extracted data; and a formatting tool wherein the formatting tool populates the data feed file with data extracted by the data execution tool.

In yet another embodiment of the invention, the system comprises at one two data storage devices accessible to at least one desktop application. More preferable, the data storage device accessible to at least one software application is a local area network or a computer hard drive. Even more preferable, the data storage device that stores the raw data file is a mainframe.

In an embodiment of the invention, the system further comprises a means to electronically transmit data between at least two data storage devices.

In an embodiment of the invention, the data extraction tool extracts data from the raw data file at a locations in the raw data file identified by at least one data-locating criterion.

In an embodiment of the invention, the system further comprises a discrimination tool wherein the discrimination tool analyzes the report created by the data extraction tool and deletes lines from the report that contain data that does not comply with at least one data-limiting criterion.

In an embodiment of the invention, the formatting tool populates said data feed file with data from the report created by the data extraction tool. In another embodiment of the invention, the formatting tool further populates the data feed file with data identified by at least one hard-coded data criterion.

Further details of the method and system of the present invention are described below with reference to the appended figures.

OVERVIEW OF AN EMBODIMENT OF THE INVENTION

FIG. 1 is a block diagram that shows the elements of a system used to carry out the steps of the present invention. The embodiment comprises a raw data file 10 stored on a mainframe 24 or other electronic data storage device. In an embodiment of the invention, the raw data file 10 comprises large amounts of data separated into records. Each record in the raw data file 10 comprises at least one data field. More preferable, each record in the raw data file contains multiple data fields. Data in a raw data file is separated into data fields by the category of data contained in the data field. One aspect of the invention comprises, multiple raw data files 10 stored on a mainframe 24 or other data storage device.

A data extraction tool 14 is also shown in FIG. 1. The data extraction tool 14 is used to locate and extract data from pre-identified locations in the raw data file 10. The data extraction tool 14 is further capable of creating a report containing the extracted data. In an embodiment of the present invention, the data extraction tool 14 is capable of locating and extracting data from multiple raw data files. The data extraction tool 14 is further capable of compiling, into one report, data extracted from multiple raw data files.

In an embodiment of the present invention, the data extraction tool 14 is a mainframe utility commonly known as UNITECH. While UNITECH is conventionally used as a printing and reconciliation tool designed to perform accounting operations, UNITECH may be customized to locate and extract data from pre-identified data fields in a raw data file 10 and create a report comprising the extracted data. Although am embodiment of the invention uses UNITECH as the data extraction tool 14, any tool capable of locating and extracting data from pre-identified locations and creating a report containing the extracted data can serve as a suitable data extraction tool 14.

A discrimination tool 12 is also shown in FIG. 1. The discrimination tool 12 is used to locate and delete data from the report created by the data extraction tool 14 based on a set of data feed file criteria. In an embodiment of the invention, the discrimination tool 12, can delete entire lines of data from the report based on a set of criteria.

The discrimination tool 12, in an embodiment of this invention, is a mainframe utility commonly known as Record Select. While Record Select is the discrimination tool 12 used in the embodiment shown, any tool or software capable of locating and deleting entire lines of data from a report based on a set of criteria can serve as the discrimination tool 12.

In an embodiment of the invention, the discrimination tool 12 is not always needed. When data feed file criteria is limited to data-locating criterion, the step involving the discrimination tool 12 may be eliminated.

The formatting tool 16 shown in FIG. 1 creates the data feed file template, extracts data from the report created by the data extraction tool 14 and populates the data feed file with the extracted data and any other data specified by the end-user. In an embodiment of the invention, the completed data feed file is electronically transmitted through an appropriate network 20 to an electronic data storage device accessible to the user-preferred desktop application 22. The formatting tool 16, in an embodiment of this invention, is a mainframe utility commonly known as SyncSort. While SyncSort is the formatting tool 16 used in the embodiment shown, any tool or software capable of locating and deleting entire lines of data from a report based on a set of criteria can serve as the formatting tool 16.

In an embodiment of the present invention, the completed data feed file is electronically transmitted from the mainframe device 24 using a file transfer protocol (FTP) to a local area network (LAN) 22 accessible to the desired desktop application.

Overview of Method of Operation

A method of operation of the present invention can be described using FIGS. 2-5.

Figure 2:
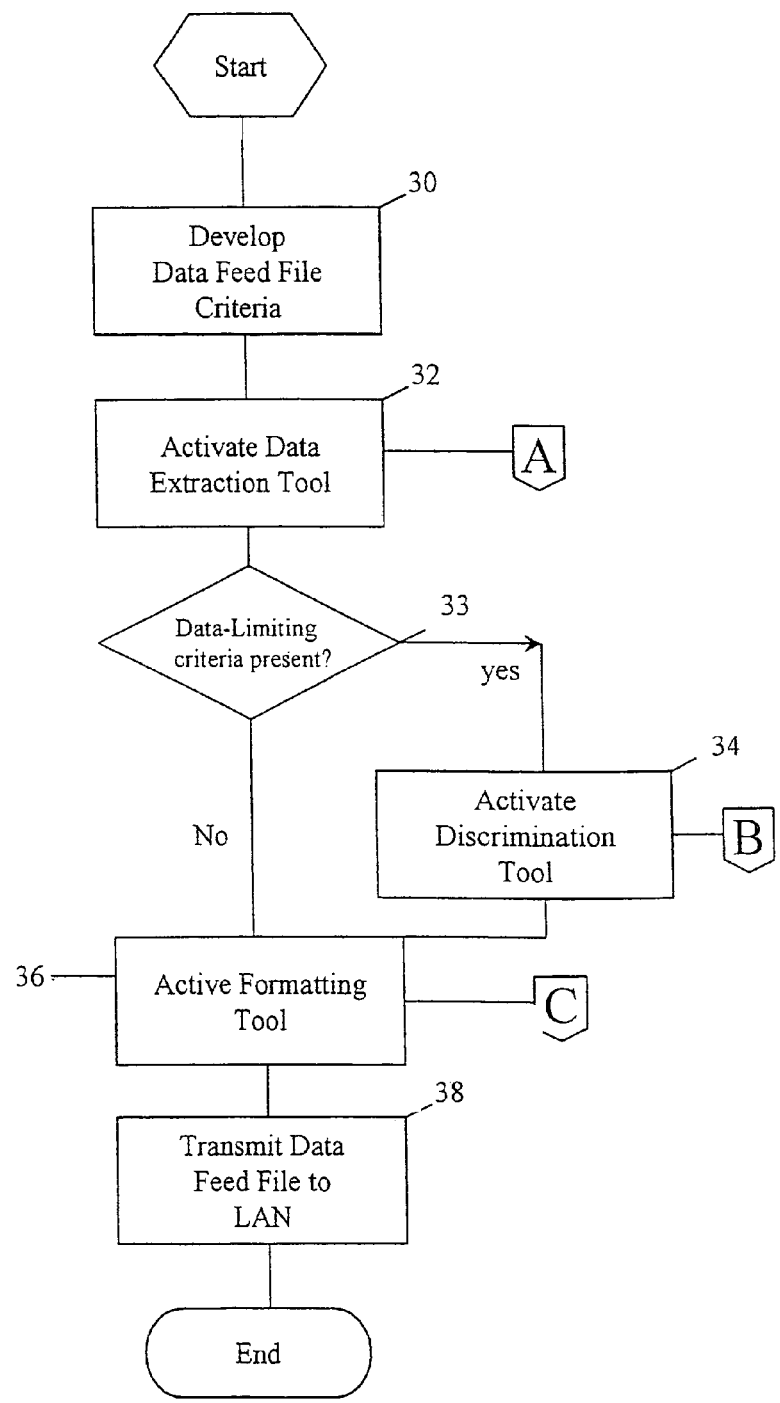
FIG. 2 is a flow diagram illustrating a method of operation of the present invention.

FIG. 2 is a flow diagram illustrating a method of operation of the present invention. In one embodiment of the invention, the end-user develops a set of data feed file criteria 30. The set of data feed file criteria 30 comprises information necessary to locate the desired data in the raw data file ("date-locating criteria").

In an embodiment of the invention, the data-locating criteria identifies the location of data fields in the raw data file that contain the desired data. The location of data fields containing desired data may be determined in a variety of ways. In an embodiment of the invention, the location of data fields is determined by identifying the category of data contained in the data field. For example, the data field that contains customer account number data may be identified as the customer account number data field.

In another embodiment of the invention, the location of the data fields containing desired data may be determined by identifying the position of the data field in the raw data file in relation to other data fields. For example, if the desired data is contained in the data field that is the fifth data field from the left in each record of the raw data file, the data field could be identified as data field number five (5).

Further methods of locating data in a raw data file will be apparent to one skilled in the relevant art.

In addition to data-locating criteria, the set of data feed file criteria may further include information to define the characteristics of the desired data ("data-limiting criteria"). For example, in addition to identifying the location of the data field that contains amounts payable data in a raw data file, the data-limiting criteria may also indicates the need for amounts payable data only if it is greater than two hundred dollars ($200).

The data feed file criteria may further comprise criteria that specifies data to be included in the data feed file that is not located in the raw data file ("hard-coded data criteria"). For example, the data feed file criteria may specify that a data field should be included in the data feed file for service fees, the amount of which varies depending on the customer's zip code. The service fees are not, however, contained in the raw data file. In such cases, the hard-coded data criteria specifies the appropriate fee for each zip code to be included in the generated data feed file.

The set of data feed file criteria 30 provides instruction for the data extraction tool 14, the discrimination tool 12, and the formatting tool 16, all of which are shown in FIG. 1. Once the set of data feed file criteria is developed 30, the data extraction is activated 32 and the data-locating criteria is provided to the data extraction tool by the end-user or some other similarly situated individual. The method of operation of the data extraction tool 14 is illustrated in FIG. 3.

Figure 3:
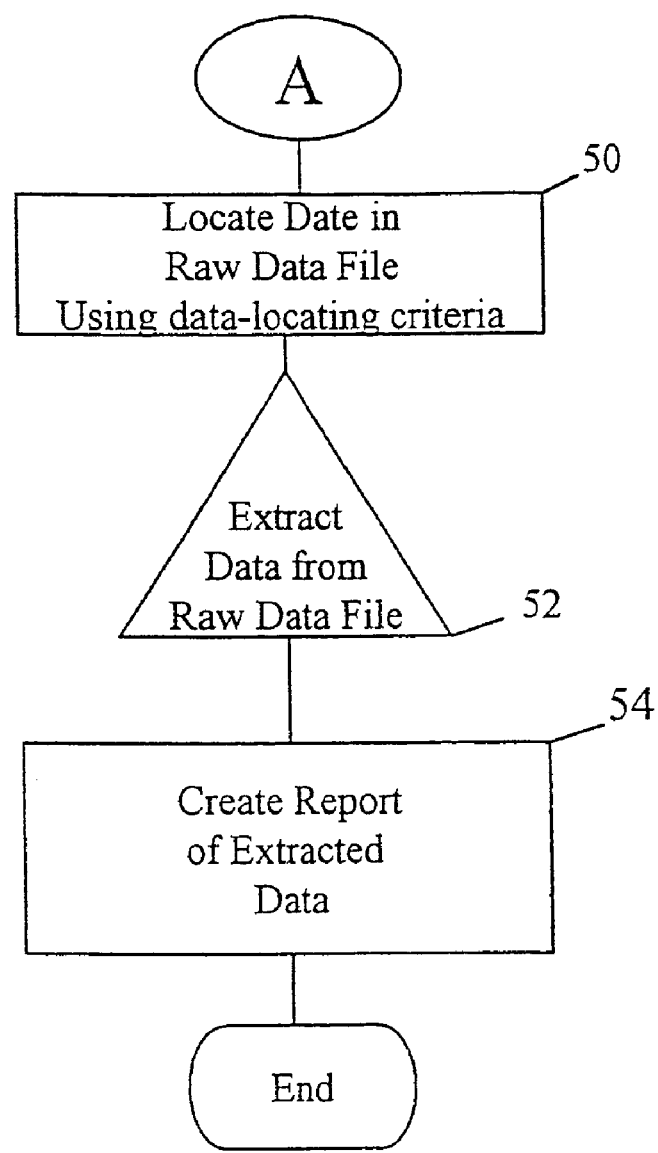
FIG. 3 is a flow diagram illustrating the method of operation of the data extraction tool.

FIG. 3 shows that the data extraction tool receives data-locating criteria. The data extraction tool then uses the data-locating criteria to locate data in the raw data file 50. Most preferably the data extraction tool locates data in the raw data file 50 based on the location of the data field containing the desired data. When the data extraction tool locates the desired data in the raw data file 50, the data extraction tool extracts the located data from the raw data file 52.

After the data extraction tool extracts the data from the raw data file 52, the data extraction tool creates a report 54. The report is comprised of all the data that the data extraction tool extracted from the raw data file. All data extracted from a single record in the raw data file is placed on the same line in the report. Data extracted from each data field is separated in the report by a space and each line in the report ends with a print control character. The print control character serves as a signal that the data extracted from a single record in the raw data file is included on that line in the report.

The report created by the data extraction tool contains all the data extracted from the raw data file based on data-locating criteria. However, as mentioned above, the data feed file criteria may also specify data-limiting criteria. When the data feed file criteria includes data-limiting criteria, the report created by the data extraction tool must be analyzed by the discrimination tool for compliance with data-limiting criteria. Thus, as shown in FIG. 2, if data-limiting criteria is developed 33 the discrimination tool is activated 34 and provided the data-limiting criteria after the data extraction tool extracts data from the raw data file and creates the report. On the other hand, if data-limiting criteria is not developed, the formatting tool is activated 36 after the data extraction tool creates the report containing extracted data.

Figure 4:
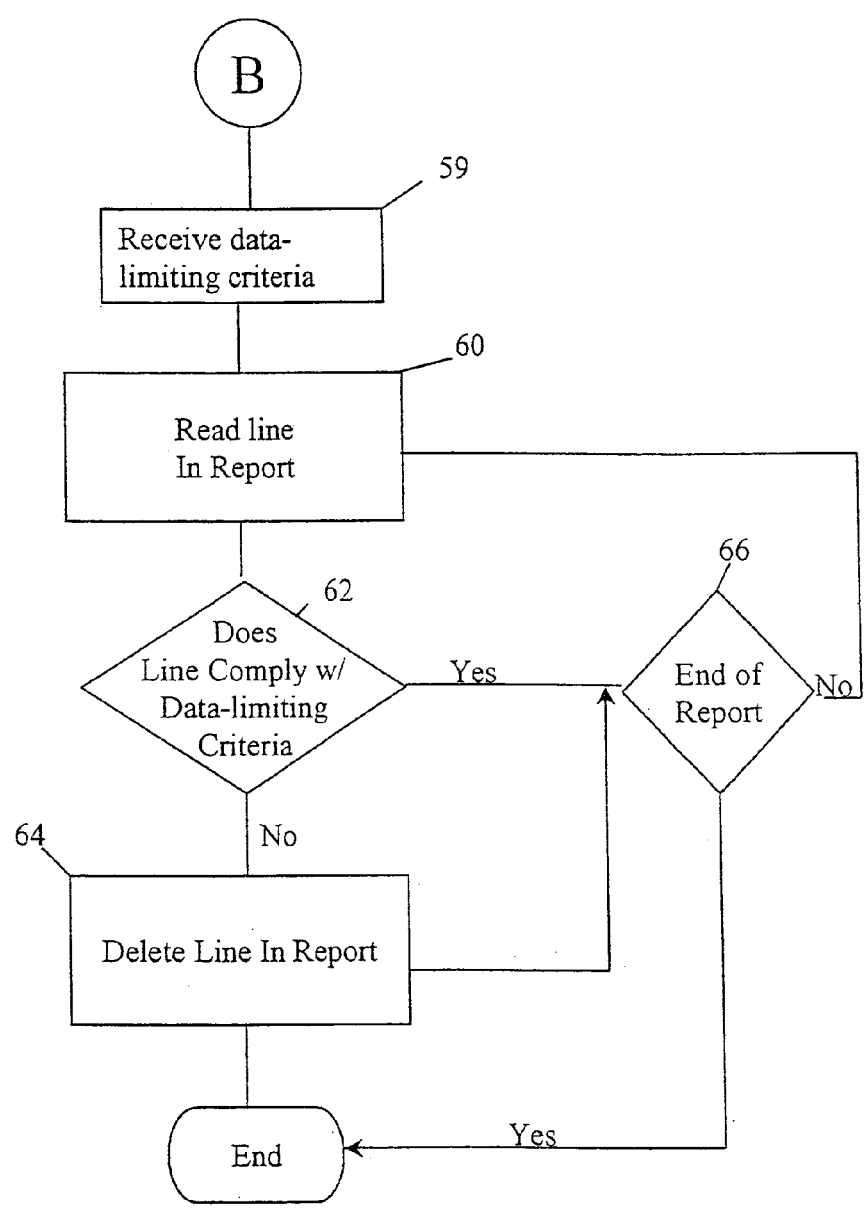
FIG. 4 is a flow diagram illustrating the method of operation of the discrimination tool.

FIG. 4 illustrates the operation of the discrimination tool. To analyze the report for compliance with data feed file criteria, the discrimination tool is provided the data-limiting criteria 59. The discrimination tool then reads each line in the report 60 to determine whether data in the report complies with the data-limiting criteria. If data on any line in the report does not comply with the data-limiting criteria 62, the discrimination tool deletes the entire line from the report 64.

For example, assume that the data-limiting criteria indicated that customer-billing data for the data feed file should only include data regarding customers whose amount payable is greater than two hundred dollars ($200). In this case, the data extraction tool would locate and extract the amount payable, regardless of amount, for each customer in the raw data file. The amount payable would then be placed in the report created by the data extraction tool. The discrimination tool then reads the report to locate lines of data on which the amount payable is less than two hundred dollars ($200). The discrimination tool would then delete each line in the report that contains an amount payable less than two hundred dollars ($200).

It is possible that the discrimination tool is not utilized in every application of this invention. For example, it is possible that the data feed file criteria will only provide data-locating criteria. In such cases, the step involving the discrimination tool may be disregarded.

Figure 5:
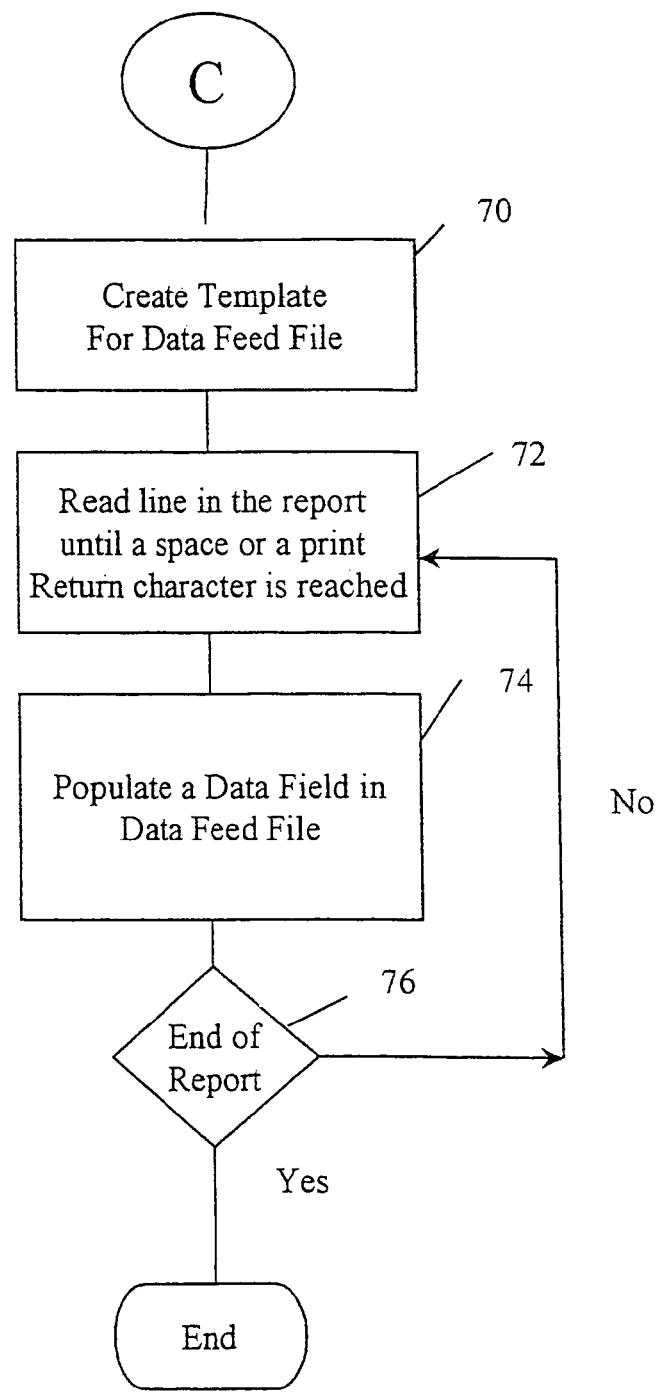
FIG. 5 is a flow diagram illustrating the method of operation of the formatting tool.

When the report created by the data extraction tool contains only the data that will be included in the data feed file, the formatting tool is triggered as shown in FIG. 2. FIG. 5 illustrates the method of operation of the formatting tool. The formatting tool 16 creates a template of the data feed file 70 using the data feed file criteria. For example, if the data feed file criteria indicates that the desired data is located in five (5) data fields of the raw data file, the formatting tool creates a data feed file template that contains at least one record comprising at least five (5) data fields. The number of additional data fields will be determined by the hard-coded data criteria. The formatting tool then reads the report 72. The formatting tool further extracts data from the report and populates the data fields 74 in the data feed file with the data from the report.

In an embodiment of the invention, the formatting tool reads the report 70 line by line from left to right. The formatting tool reads data from left to right in the report until it reaches a space in the report. When the formatting tool reaches a space in the report, the formatting tool populates the data field in the raw data file 74 with data located just before the space. The formatting tool continues this process until it reaches the end of the line in the report. In an embodiment of the present invention, the formatting tool also populates the data feed file as specified by the hard-coded criteria. For example, if the hard-coded criteria states that records with a designated zip code should also include a service fee of $2.00, the formatting tool locates records in the data feed file that meets that criteria and populates the data field in the data feed file with the appropriate service fee.

In an embodiment of the invention, the end of a line in the report is signaled by a print stop character located at the end of each line in the report. When the formatting tool reaches the print stop character at the end of the line in the report, the formatting tool starts to populate the next record in the data feed file by reading the next line in the report from left to right and populating data fields 74 in the data feed file in the matter described above. The process of extracting data from the report and populating data fields in a record of the data feed file continues until all the data in the report is put in the data feed file, i.e. until the data extraction tool reaches the end of the report 76.

Returning to FIG. 2, after the formatting tool has populated the data feed file, the data feed file is ready to be transferred to a location accessible to the user-preferred desktop application 38. In an embodiment of the invention, the data feed file is transferred, using the appropriate network, to a location accessible to the preferred desktop application for which the data feed file was created. The location accessible to the preferred desktop application may be a desktop computer's hard drive, a local or wide area network or any other like location electronically accessible to the preferred desktop application. The method of electronically transferring a data file from one location to another will be apparent to one skilled in the relevant art.

What is claimed is:

1. A method for generating a data feed file from at least one raw data file for use by a desktop application comprising:
   developing a set of data feed file criteria comprising at least one data-locating criterion, that is received by a data extraction tool of a first device;
   extracting at least a portion of data from a raw data file based on at least one data-locating criterion, utilizing the data extraction tool;
   generating a report having data extracted from the raw data file, utilizing the data extraction tool;
   determining whether data in the report complies with data-limiting criteria, utilizing a discrimination tool;
   deleting lines from the report which contain data that does not comply with the data-limiting criteria to obtain an updated report, utilizing the discrimination tool;
   generating the data feed file with data from the updated report, utilizing a formatting tool; and
   transmitting the data feed file from the first device to a location electronically accessible to the desktop application of a second device, utilizing a network operably coupled between the first device and the second device.

2. The method of claim 1 wherein the location accessible to the desktop application is a local area network electronically accessible to a desktop application.

3. The method of claim 1 wherein the data-locating criterion identifies a location of data in the raw data file needed for the data feed file.

4. The method of claim 3 wherein said location of data in the raw data file is defined as the location of the data field in each record of the raw data file containing data needed for the data feed file.

5. The method of claim 4 wherein the data field location is identified by the category of data contained in the data field.

6. The method of claim 4 wherein the data field location is identified by the position of the data field in each record of the raw data file.

7. The method of claim 1 wherein the data feed file criteria further comprises at least one hard-coded data criterion, wherein the hard-coded data criterion specifies data to be included in the data feed file that is not included in the raw data file.

8. The method of claim 7 further comprising populating the data feed file with data specified by the hard-coded data criteria.

9. The method of claim 1 wherein the raw data file is stored on an electronic storage device.

10. The method of claim 9 wherein the electronic storage device is a mainframe computer.

11. The system of generating a data feed file from a raw data file for use by a desktop application comprising:
    first and second data storage devices;
    a data extraction tool configured to extract
       at least one portion of data from the raw data file stored on the first data storage device based on at least one data-locating criterion, and to generate
       a report comprising the extracted data;
    a discrimination tool configured to determine whether data in the report complies with data-limiting criteria the discrimination tool further configured to delete lines of the report which contain data that does not comply with the data-limiting criteria to obtain an updated report;

a formatting tool configured to extract the data from the updated report and to populate the data feed file with data extracted from the updated report; and a network configured to electronically transmit the data feed file from the first data storage device to the second data storage device such that the data feed file is electronically accessible by the desktop application.

12. The system of claim 11 wherein said formatting tool further populates the data feed file with data specified by at least one hard-coded data criterion.

* * * * *